United States Patent

[11] 3,561,695

| [72] | Inventor | Garfield A. Wood, Jr. |
| | | 4565 Sabal Palm Road, Miami, Fla. 33137 |
| [21] | Appl. No. | 689,174 |
| [22] | Filed | Dec. 8, 1967 |
| [45] | Patented | Feb. 9, 1971 |

[54] ELECTRIC FLY REEL
3 Claims, 7 Drawing Figs.

| [52] | U.S. Cl. | 242/84.1 |
| [51] | Int. Cl. | A01k 89/00 |
| [50] | Field of Search | 242/84.1(A), 84.3, 84.5; 43/21 |

[56] References Cited
UNITED STATES PATENTS

| 2,190,398 | 2/1940 | Bugatti | 43/21 |
| 2,340,892 | 2/1944 | Maynes | 242/84.3X |
| 2,609,160 | 9/1952 | Van Sciver et al | 242/84.3 |
| 3,017,134 | 1/1962 | Duvall | 242/84.1(A)X |
| 3,116,892 | 1/1964 | Pickard | 242/84.1(A)X |
| 3,195,829 | 7/1965 | Balaguer | 242/84.1(A)X |

*Primary Examiner*—Billy S. Taylor
*Attorney*—Lane, Aitken, Dunner & Ziems

ABSTRACT: An electric fly reel having a handle for rotating the spool in a conventional manner to reel in a fish and a miniature electric motor for rotating the spool with sufficient torque to reel in slack in the line. The motor is powered by a plurality of small pen cell batteries mounted on the reel.

PATENTED FEB 9 1971
3,561,695
SHEET 1 OF 3
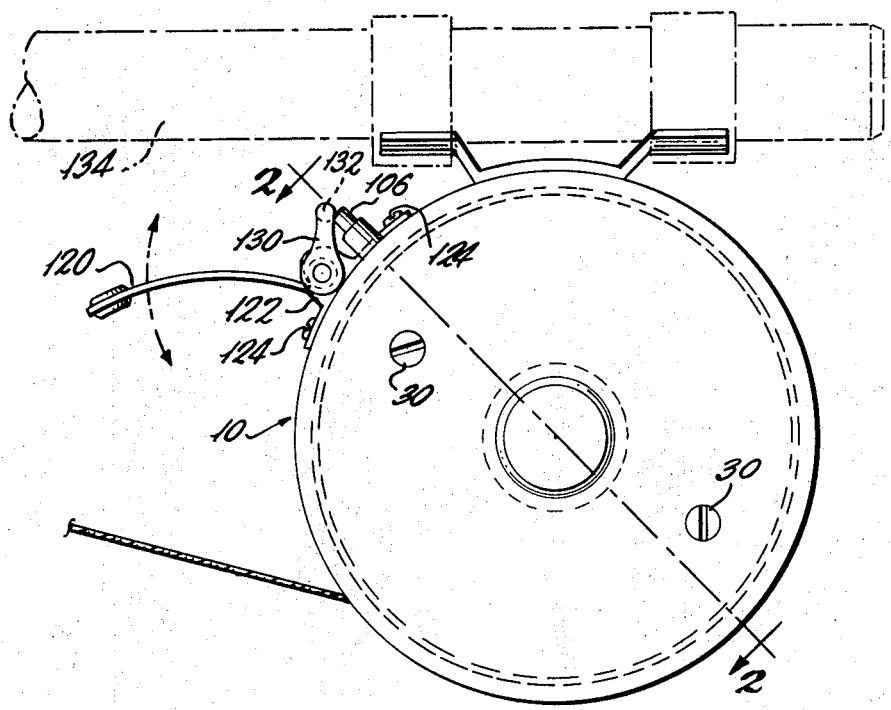
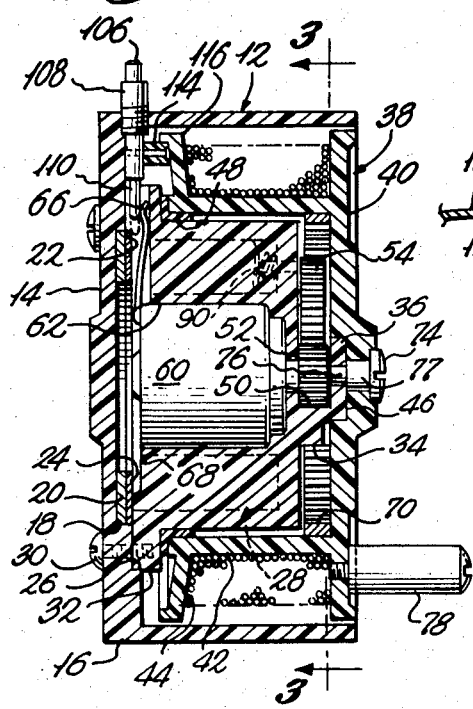
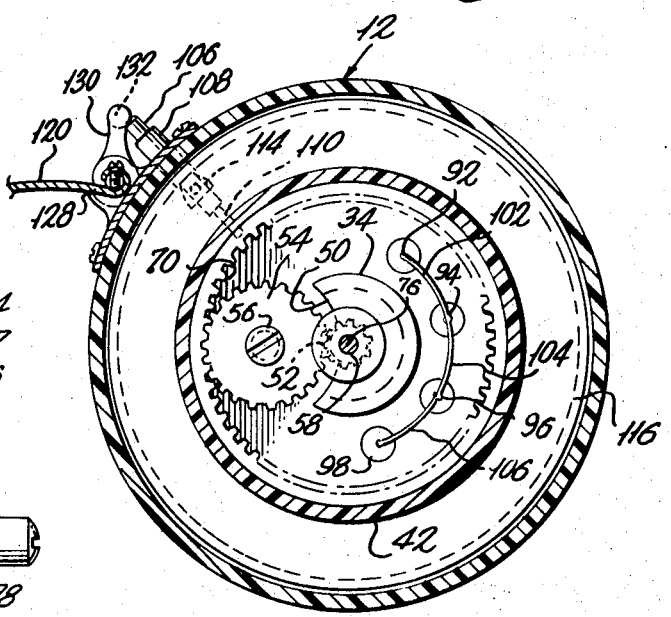
INVENTOR
Garfield A. Wood, Jr.
BY Lane, Aitken, Dunner & Ziems
ATTORNEYS INVENTOR
Garfield A. Wood, Jr.
BY Lane, Aitken, Dunner & Ziems
ATTORNEYS INVENTOR
Garfield A. Wood, Jr.

BY
Lane, Aitken, Dunner + Ziems
ATTORNEYS

ELECTRIC FLY REEL

BACKGROUND OF THE INVENTION

The present invention relates to fly reels and more particularly to a fly reel having an electric motor for rotating the spool.

In using a fly reel, long lengths of line are often stripped from the reel so that a cast can be made by taking up the slack in the line without rotating the spool. On many occasions a fisherman has too much line stripped out and he must manually rotate the spool to take up the excess slack. Fly reels are now being marketed with a spring drive which can be wound tight to rotate the spool when the spring is released. A suitable trigger finger is provided to enable a fisherman to release the coiled spring to rotate the spool to rapidly reel in the slack. The spring cannot rotate the spool very long before unwinding, and the spring force is weak and uneven, being strong at the beginning and diminishing to a very weak force near the end. In addition the spring must be rewound by hand after each use.

BRIEF SUMMARY OF THE INVENTION

In accordance with the present invention a fly reel is provided having a miniature electric motor and gear reduction drive for rotating the spool. The motor is powered by a plurality of small pen cell batteries conveniently mounted in the body of the reel to make a completely self-contained reel. A handle is provided for rotating the spool manually and independently of the electric motor drive. The gear drive between the motor and the spool is such as to idle freely when the spool is manually rotated by the handle.

Whenever a fisherman desires to takeup slack in the line, he simply actuates a trigger finger similar to the trigger finger employed in the prior art spring powered fly reels. This closes a switch to energize the motor and rotate the spool at a speed determined by the r.p.m. of the motor output shaft and the reduction gearing. This speed remains substantially constant until the batteries lose their strength.

When the batteries are too weak, or go dead, the reel can be operated in a conventional manner until the batteries are replaced. A simple drag element is provided for exerting a slight drag on the spool when the electric motor is deenergized to reduce overrunning of the spool. The electric fly reel is simple in construction, easily assembled and disassembled, compact, lightweight, economical and efficient in use.

Electric-fishing reels in general are known in the art. For example, there have been electric deep sea-fishing reels having an electric motor thereon adapted to be driven by the battery of a boat, or some external battery supply available to a fisherman. The motor is designed to reel in the fish so that a fisherman will not have to manually wind in the line. There is also an electric motor-operated fishing reel of the type disclosed in the U.S. Pat. to Stealy No. 3,248,819. The motor is a relatively powerful motor powered by four 1½-volt dry cells mounted in an enlarged handle on one end of the rod. The motor provides the sole means for rotating the spool to reel in the line when a fish is caught. Should the batteries go dead, the spinning reel can not be used until replacement batteries are obtained.

The features of novelty of the present invention will be specifically pointed out or will otherwise become apparent when referring, for a better understanding of the invention, to the following description taken in conjunction with the accompanying drawings.

BRIEF DESCRIPTION OF THE DRAWINGS

FIG. 1 is a side view of a fly reel embodying features of the invention;

FIG. 2 is a cross-sectional view taken along the line 2–2 of FIG. 1;

FIG. 3 is a sectional view taken along the line 3–3 of FIG. 2;

FIG. 5 is a schematic circuit diagram illustrating the manner in which the batteries are connected to the motor and the manner in which the motor is switched on;

DESCRIPTION OF THE PREFERRED EMBODIMENTS

Figure 4:
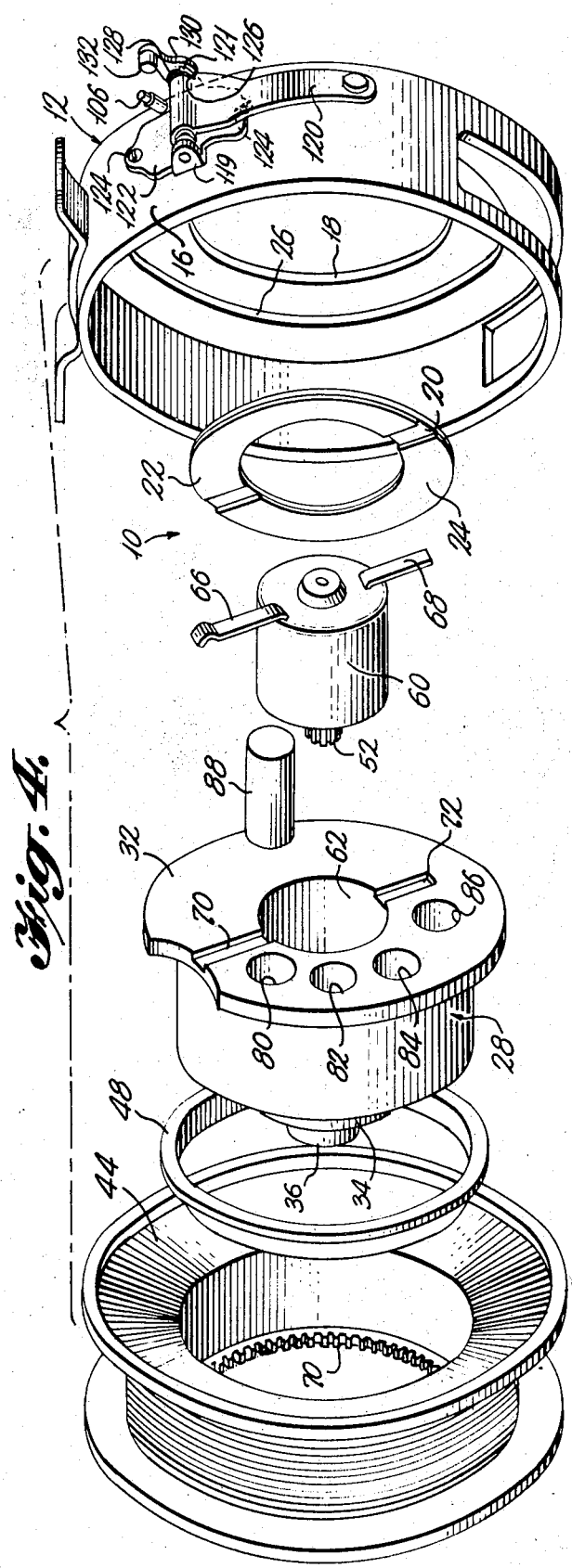
FIG. 4 is an exploded view of the fly reel of FIG. 1.

Referring to FIGS. 1—4 a fly reel 10 is illustrated which embodies features of the invention. It comprises a cup-shaped housing 12 having a circular end wall 14 and a cylindrical wall preferably made of a suitable plastic material. The inner surface of the end wall 14 is recessed as at 18 and a washer-shaped element 20 of a suitable electric-insulating material, such as mycarta, is positioned in the recess 18. Arcuate contacts 22 and 24 preferably made of copper are affixed on the inner face of the element 20 with their ends spaced slightly so that the arcuate contacts are electrically insulated from one another.

The inner surface of the end wall 14 is provided with a second circular recess 26 concentric with and larger than the recess 18. A cylindrical hub 28 also preferably made of a plastic material is removably mounted on the end wall 14 by a plurality of screws 30 which threadably engage a circular flange 32 of the hub. The right end of the hub 28 (as viewed in FIG. 2) has a reduced cylindrical projecting portion 34 and a further reduced cylindrical projecting end portion 36.

A spool 38 preferably made of the same plastic material as the body 12 is rotatably journaled on the hub 28. The spool comprises a circular end wall 40 having an outer diameter slightly less than the internal diameter of the cylindrical wall 12 so as to fit within the cylindrical wall 12 with a slight clearance therebetween, a cylindrical portion 42 and a flange portion 44. A circular recess 46 in the end wall 40 is journaled on the projecting end portion 36 of the hub 28 and a circular bearing element 48 made of a suitable material such as Teflon or nylon, and having an angle-shaped cross section, is interposed between the inner end of the cylindrical portion 42 of the spool and the juncture between the hub 28 and flange 32 to journal the spool on the hub at this point.

The projecting portions 34 and 36 of the hub are slotted as at 50, as best seen in FIGS. 2 and 3, to provide sufficient room for a pinion gear 52 and an idler spur gear 54. The spur gear 54 is rotatably journaled on the hub 28 in a suitable manner, such as by a screw 56. The pinion gear 52 is fixed on the end of an output shaft 58 of a miniature, permanent magnet, electric motor 60 positioned within a central bore 62 in the hub 28. The central bore 62 opens on the left face of the hub 28 as viewed in FIG. 2 (the right face as viewed in FIG. 4). This enables the motor to be inserted and removed from the central bore, the spur gear 52 being removable along with the motor.

Electrical connections are made to the motor by contacts 66 and 68 which are fixed to the motor fit within slots 70 and 72, respectively, in the inner face of the flange 32 (FIG. 4) so as to key the motor 60 against rotation relative to the hub 28. As best seen in FIG. 2 the bent end of the contact 66 projects beyond the arcuate contact 22, for a purpose to be described, and the contact 68 resiliently engages the arcuate contact 24.

The spur gear 54 meshes with an internal ring gear 70 which is preferably made of aluminum. The ring gear is fixed within the cylindrical portion 42 of the spool against the inner surface of the end wall 40. Thus when the motor is energized, as will be described, it rotates the spool 38 at a reduced speed determined by the gear ratio between the pinion gear 52 and the internal ring gear 70.

The end wall 40 of the spool is fixed to the projecting end portion 36 of the hub by a bearing pin 74 having a reduced threaded end portion 76 threadably engaging the projecting end portion 36. An enlarged nonthreaded portion 77 is provided on the pin 74 to facilitate relative rotation between the end wall 40 and the pin 74.

The electric motor rotates the spool for the purpose of taking up the slack in a line that occurs when the line is stripped from the spool 38 just before casting. The motor is not for the purpose of rotating the spool to reel in a fish, and therefore, in the preferred embodiment illustrated the miniature motor is approximately a one one-hundredth horsepower motor. A handle 78 is mounted on the end wall 40 of the spool, as illustrated in FIG. 2, to enable the spool to be rotated in a conventional manner to reel in a fish.

As best seen in FIG. 4 the hub 28 is provided with four battery chambers 80—86 extending parallel to the axis of the hub and opening on the inner face of the hub in position to overlie the arcuate contacts 22 and 24. Specifically the chambers 80 and 82 overlie the arcuate contact 22 and the chambers 84 and 86 overlie the arcuate contact 24. Suitable pen cell batteries 88 (one of which is shown in FIG. 4) are positioned in the battery chambers. The batteries in the chambers 80 and 82 are oriented so that their positive terminals engage the arcuate contact 22 and the batteries in the chambers 84 and 86 are reversed so that their negative terminals engage the arcuate contact 24. The batteries are biased outwardly by suitable springs 90 positioned inside the battery chambers, one of which is shown in phantom in FIG. 2.

Terminals 92—98 are mounted in the bottoms of the battery chambers in position to make electrical contact with the batteries and project through the bottom walls in position to be electrically interconnected by wires 100, 102 and 104 as seen in FIG. 3.

Figure 5:
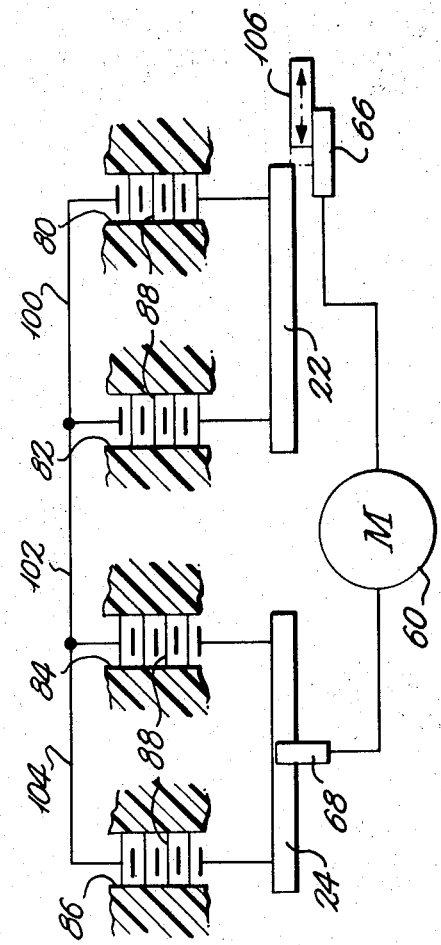

The schematic circuit diagram of FIG. 5 more clearly illustrates the electric circuit in which the batteries and motor are connected. It will be observed that the motor is connected to the arcuate contact 24 by the contact finger 68 which is normally resiliently biased thereagainst. The elongated resilient contact finger 66 is normally spaced from the arcuate contact 22 and resiliently engages a plunger contact 106 which is normally spring biased outwardly to the position illustrated in FIG. 5, as will be described. When the plunger contact 106 is depressed (moved to the left as illustrated in FIG. 5) to the position illustrated in phantom, it abuts against the arcuate contact 22 while maintaining resilient sliding contact with the contact finger 66 to complete the circuit to the motor 60.

Referring specifically to FIG. 2, the contact finger 106 extends through the cylindrical wall 16 of the reel body and is mounted for reciprocal movement relative thereto by a cylindrical element 108 fixed in the wall 16. The plunger is normally resiliently biased to the retracted position by spring means (not shown) within the cylindrical element 108. The lower end 110 of the plunger 106 is resiliently engaged by the contact finger 66 and is spaced slightly above the periphery of the arcuate shoe 22.

A brake shoe 114 made of nylon or other suitable material is fixed on the lower end 110 of the plunger in position to slidably engage the underside of a circular lip 116 on the periphery of the flange 44 of the spool. This limits the upward movement of the plunger 106 and also imposes a slight drag on the spool to reduce overrunning of the spool when the line is stripped therefrom. When the plunger 106 is depressed, it will move downwardly until the lower end 110 abuts against the upper periphery of the arcuate contact 22. This completes the circuit between the contact finger 66 and the arcuate contact shoe 22 to energize the motor 60 as described in connection with FIG. 5.

The plunger 106 may be conveniently actuated by a trigger finger 120 pivotally mounted between upstanding lugs 119 and 121 of a bracket 122 fastened to the cylindrical wall 16 of the reel body, such as by suitable screws 124 as best seen in FIGS. 1 and 4. The trigger finger 120 is normally resiliently biased to the position illustrated in FIG. 4 by suitable spring means (not shown) and can be pivoted to its cocked position as illustrated in FIG. 1. In the cocked position a projecting shoulder 126 on the finger engages a shoulder 128 on the lug 121 of the bracket to restrict the trigger finger against pivotal movement in a counterclockwise direction, as viewed in FIG. 1, while leaving it free to be pivoted in a clockwise direction. A small crank arm 130 is keyed for pivotal movement with the trigger finger 120 and has a projecting pin 132 on the end thereof in position to engage the plunger 106 when in the cocked position illustrated in FIG. 1. When trigger finger 120 is pivoted in a clockwise direction from the cocked position it depresses the plunger 106 and energizes the electric motor 60 to rotate the spool. To uncock the trigger finger, it is simply shifted to one side to disengage the shoulders and allowed to spring bias itself to the retracted position shown in FIG. 4.

The trigger finger 120 is located conveniently immediately beneath the fishing rod 134 so that a fisherman can actuate the trigger finger without removing his hand from the fishing rod. When a fisherman wants to reduce the amount of slack in the line, or takeup the slack altogether, he simply pulls on the cocked trigger finger 120 to energize the electric motor to rotate the spool. When fighting or reeling in a fish, however, the spool is manually rotated by the handle 78 in a conventional manner. When the motor is deenergized by allowing the plunger 106 to return to its normal retracted position as illustrated in FIG. 2, the brake shoe element 114 automatically slidably engages the lip 116 to impose a slight drag on the spool to more quickly stop the spool. This slight drag will also be present when the spool is manually rotated by the handle 78, or by a running fish taking line, in each case this slight drag is beneficial to prevent overrunning of the reel.

Figure 6:
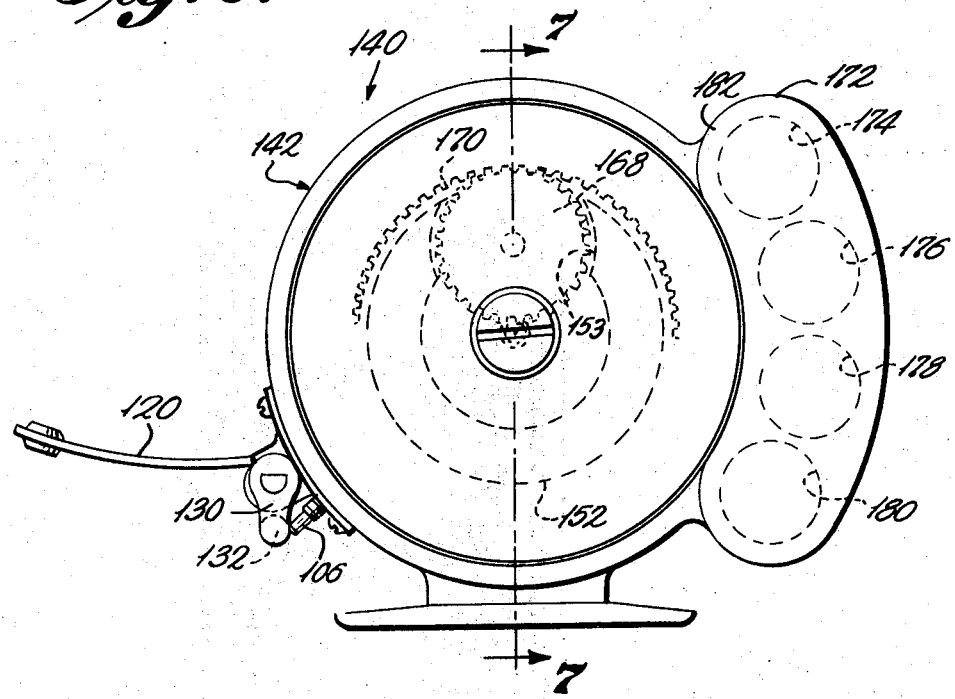
FIG. 6 is a side view of an electric fly reel illustrating another embodiment of the invention.
Figure 7:
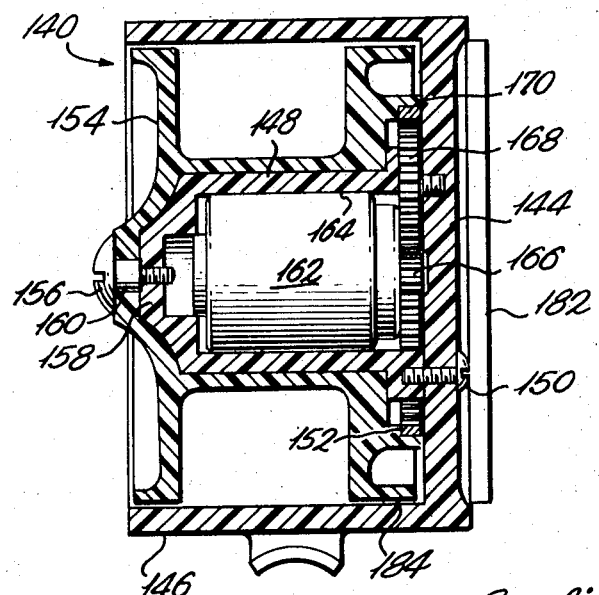
FIG. 7 is a cross-sectional view taken along the line 7–7 of FIG. 6.

Referring to FIGS. 6 and 7 an electric fly reel 140 is shown which illustrates another embodiment of the invention. It comprises a cup-shaped body 142 preferably molded as one piece from a suitable plastic material. The body has an end wall 144 and a cylindrical wall 146. A hub is mounted on the end wall 144 by a plurality of screws extending through the end wall and threadably engaging a flange 152 on the inner end of the hub 148. A spool 154 is rotatably journaled on the hub 148 and is fixed thereto by a bearing pin 156 which threadably engages the end wall 158 of the hub 148, the spool 154 rotating on an enlarged cylindrical portion 160 of the pin 156 as in the previous embodiment.

A miniature electric motor 162, similar to the motor 60 is positioned within a central bore 164 in the hub 148 which opens on the flanged end of the hub. A pinion gear 166 is fixed on the output shaft of the motor in position to mesh with an idler gear 168 rotatably journaled on the end wall 144. An internal ring gear 170 is fixed on the spool 154 in position to mesh with the idler gear 168. A portion of the end face of the flange 152 has a C-shaped depression 153 formed therein to provide room for the idler gear 168.

The cylindrical wall 146 of the body has an enlarged arcuate projection 172 integrally molded thereon which has four battery chambers 174—180 opening on the right end of the body, as viewed in FIG. 7. The depth of the battery chambers is substantially equal to the axial length of the cylindrical wall 146. Standard AA pen cell batteries are positioned within each of the chambers and the open ends of the chambers are closed by a suitable cover plate 182. With this construction the batteries can be significantly longer than those of the fly reel 10 previously described, and they can be replaced by simply removing the cover plate 182 without having to disassemble the hub from the end wall, as in the case of the fly reel 10.

The batteries are connected to the motor 162 by suitable wires (not shown) so that pairs of the batteries are connected in parallel with one another and the two pairs are connected in series with the motor, as in the circuit diagram of FIG. 5. The wiring includes a pair of spaced contacts (not shown) positioned to be engaged by the plunger 106 to provide the switching action for making and breaking the circuit for energizing the motor. The plunger 106 is the same as that employed in the previous embodiment and is actuated by the trigger finger 120 which is also the same as that previously described. The plunger includes a brake element (not shown) similar to the element 114 for slidably engaging the underside of the rim 184 of the spool to provide the slight frictional drag previously described when the plunger 106 is normally biased to its retracted position.

While it will be apparent that the embodiments of the invention herein disclosed are well calculated to fulfill the objects of the invention, it will be appreciated that the invention is susceptible to modifications, variation and change without departing from the proper scope or fair meaning of the subjoined claims.

I claim:

1. An electric fly reel comprising a body, a spool rotatably mounted on said body, handle means mounted on said spool for manually rotating said spool, a miniature electric motor mounted on said body within said spool, drive means drivingly connecting the output shaft of said motor to said spool to rotate the spool when the motor is energized while leaving the spool free to be rotated by said handle means when the motor is deenergized, battery chamber means mounted on said body, means electrically connecting said battery chamber means to said motor, said last-mentioned means including switch means mounted on said body in position to be actuated by the fishermen for controlling the energization and deenergization of said motor, said body being a molded body having battery chambers formed therein for containing the batteries concealed from view, said body having a cylindrical wall surrounding said spool with an arcuate portion projecting outwardly along a portion of the periphery of said cylindrical wall, said battery chambers extending parallel to the axis of rotation of said spool and opening on one end face of said arcuate portion, and an arcuate covering plate closing off the open ends of said chambers to conceal and retain the batteries therein and to enable the batteries to be inserted and removed without disassembling the spool from the body.

2. An electric fly reel comprising a body having a cup-shaped body portion with a circular end wall and a cylindrical wall, a hub mounted on said circular end wall within said cylindrical wall concentric with the axis thereof, an electric motor mounted within said hub, a spool rotatably mounted on said hub within said cylindrical wall for rotation about said axis, manual handle means mounted on said spool for manually rotating said spool, gear means for drivingly connecting the output shaft of said motor to said spool for rotating the spool independently of said handle means, battery chamber means in said reel for supporting a plurality of batteries, circuit means electrically connecting said battery chamber means to said motor, and said circuit means including switch means for making and breaking the circuit to said motor to energize and deenergize the motor, and an arcuate projection on said cylindrical wall extending over a portion of the periphery thereon, said plurality of battery chambers being located in said arcuate projection and extending parallel to said axis, said hub having a central bore therein opening on one end face thereof with said electric motor positioned within said central bore.

3. An electric fly reel comprising a body having a cup-shaped body portion with a circular end wall and a cylindrical wall, a hub mounted on said circular end wall within said cylindrical wall concentric with the axis thereof, an electric motor mounted within said hub, a spool rotatably mounted on said hub within said cylindrical wall for rotation about said axis, manual handle means mounted on said spool for manually rotating said spool, gear means for drivingly connecting the output shaft of said motor to said spool for rotating the spool independently of said handle means, battery chamber means in said reel for supporting a plurality of batteries, circuit means electrically connecting said battery chamber means to said motor, said circuit means including switch means for making and breaking the circuit to said motor to energize and deenergize the motor, and brake means actuated by said switch means, said brake means slidably engaging said spool to exert a slight drag thereon when said motor is deenergized by said switch means and being disengaged from said spool when said motor is energized by said switch means.